United States Patent [19]

Shimano

[11] 4,343,201
[45] Aug. 10, 1982

[54] SPEED CONTROL DEVICE
[75] Inventor: Keizo Shimano, Sakai, Japan
[73] Assignee: Shimano Industrial Company Limited, Osaka, Japan
[21] Appl. No.: 165,935
[22] Filed: Jul. 2, 1980
[30] Foreign Application Priority Data
  Jul. 16, 1979 [JP] Japan .............................. 54-98938[U]
[51] Int. Cl.³ .............................................. G05G 5/06
[52] U.S. Cl. ...................................... 74/475; 74/489; 74/527
[58] Field of Search ............. 74/475, 487, 489, 501 R, 74/527

[56] References Cited
U.S. PATENT DOCUMENTS 3,406,587 10/1968 Brilando et al. ...................... 74/475
4,232,564 11/1980 Yamasaki ............................. 74/475
4,263,818  4/1981 Ozaki ................................... 74/475
4,267,744  5/1981 Yamasaki ............................. 74/475

FOREIGN PATENT DOCUMENTS 737848 7/1943 Fed. Rep. of Germany .
1034496 7/1958 Fed. Rep. of Germany .
1605783 1/1971 Fed. Rep. of Germany .
2012893 8/1979 United Kingdom .................. 74/475

Primary Examiner—Allan D. Herrmann
Attorney, Agent, or Firm—Stevens, Davis, Miller & Mosher

[57] ABSTRACT

A speed control device, which operates a control wire to actuate a derailleur and comprises a fixing member, a lever shaft, and a control lever, and a retaining mechanism for retaining the lever at one speed change position, the retaining mechanism between the fixing member and the control lever having releasing mechanism for releasing the retaining of the lever.

8 Claims, 10 Drawing Figures

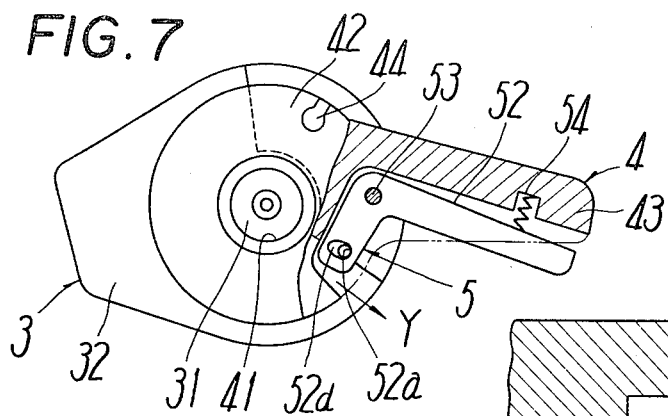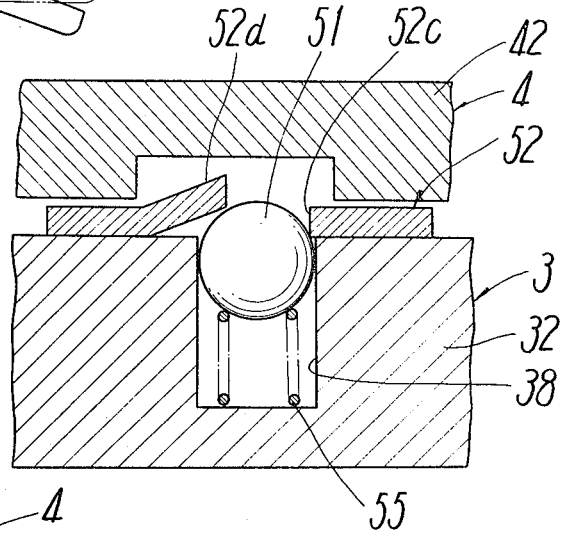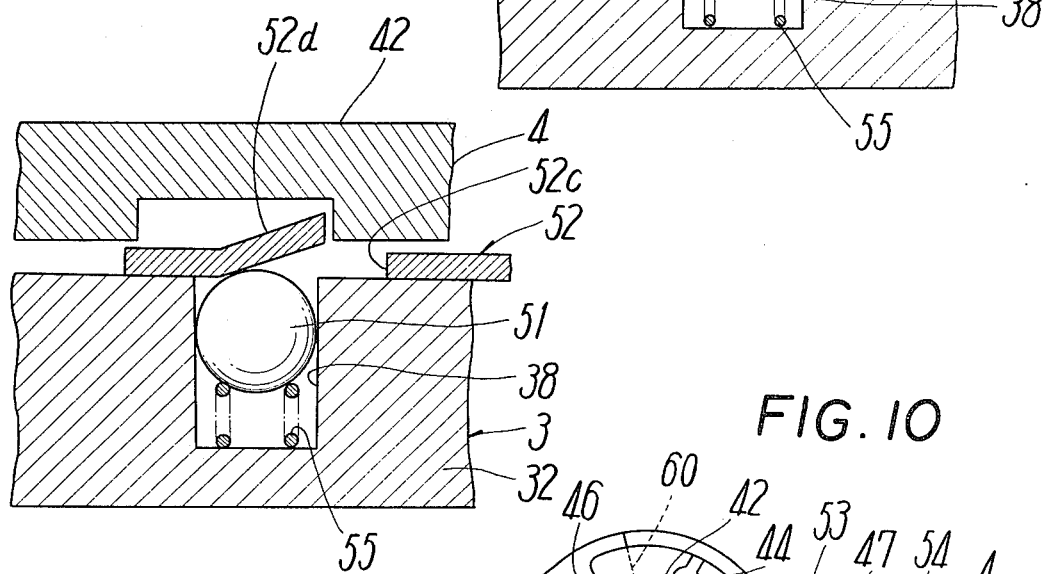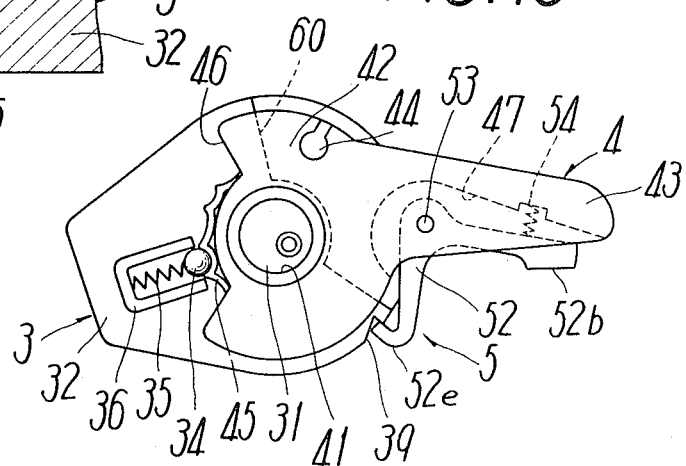

SPEED CONTROL DEVICE

FIELD OF THE INVENTION

This invention relates to a speed control device mainly for operating a derailleur for a bicycle, and more particularly to a speed control device which operates a control wire to actuate the derailleur and comprises a fixing member fixed to a handle bar, a lever shaft fixed to the fixing member, and a control lever supported rotatably to the lever shaft.

BACKGROUND OF THE INVENTION

Generally, this kind of speed control device is provided in proximity to the grip of the handle bar or at the bicycle frame, such as the top tube. In the former case, a driver operates the control lever by the fingers of his hand which grips the handle grip.

A conventional speed control device, however, provides the control lever with friction to overcome a spring force of a return spring at the derailleur, so that the control lever, when operated against tension of the return spring, should be given a force overcoming the force of the return spring and the friction of the control lever, and, when operated in the direction of the tension of the return spring, should be given a force overcoming the friction.

Accordingly, a relatively greater force is required to operate the control lever in either direction. Furthermore, the control lever, when disposed to facilitate its operation in one direction, conversely is not easy to operate in the other direction.

SUMMARY OF THE INVENTION

In light of the aforesaid problem, this invention has been designed. An object of the invention is to provide a speed control device, which has better controllability, is operable with a light touch, and ensures that the control lever is retained at a predetermined position. This invention is characterized in that between the control lever and the fixing member there is provided a retaining mechanism to retain the control lever at a position corresponding to a desired speed change stage, and at the retaining mechanism then is provided a releasing means to release the control lever retained by the retaining mechanism.

In other words, the speed control device of the invention is capable of positioning the control lever without utilizing the friction as in the conventional example. The device is not provided merely with a positioning mechanism between the control lever and the fixing member, but can retain the control lever at a position corresponding to a desired speed change stage, while, the lever is operated to be released from its retained position so that a rider may operate the control lever with a light touch for changing the bicycle speed.

BRIEF DESCRIPTION OF THE DRAWINGS

FIG. 7 is a plan view of a modified embodiment of the invention, in which its cover is removed, FIGS. 8 and 9 are enlarged sectional views of the principal portion of the embodiment in FIG. 7, and FIG. 10 is a plan view of another modified embodiment of the invention, in which its cover is removed.

DETAILED DESCRIPTION OF THE INVENTION

Figure 1:
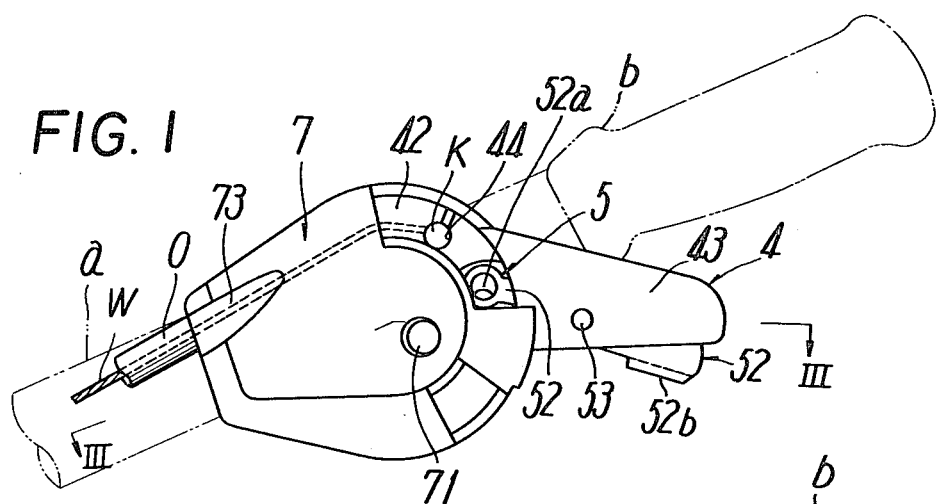
FIG. 1 is a plan view of a typical embodiment of a speed control device of the invention.

A two stage speed control device is shown in the drawings, in which reference numeral 1 designates a fixing member fixed to a handle bar a of the bicycle. The fixing member 1 comprises a tightening band 2 fixed to the handle bar a and a supporting member 3 having a lever shaft 31 projecting therefrom.

The tightening band 2 is provided at its intermediate portion with a protrudent tubular shaft 21 and at the utmost ends with tongues 22 respectively. A bolt 23 is inserted through the tongues 22 and tightened with tightening means, such as a nut, thereby fixing the band 2 to the handle bar a.

The supporting member 3 comprises a base 32 and the lever shaft 31. The base 32 is slanted at its upper surface and the shaft 31 projects from the upper slant surface of base 32. A mounting bore 33 vertically perforates through the base 32 and lever shaft 31, the tubular shaft 21 being inserted into the mounting bore 33.

The lever shaft 31, when the supporting member 3 is attached to the band 2, is axially slanted foreward. At the upper surface of base 32 is provided a holder 36 for holding a ball 34 through a spring 35, the ball 34 engaging with a click plate of leaf spring supported to a control lever to be hereinafter described.

Reference numeral 4 designates a control lever supported rotatably to the lever shaft 31. The control lever 4 comprises a tubular boss 42 having at its center a mounting bore 41 and a control portion 43 extending radially outwardly from the boss 42. The mounting bore 41 of boss 42 is inserted rotatably onto the lever shaft 31, so that the control portion 43 is slanted downwardly with respect to the plane of boss 42 so as to be kept horizontal. Hence, the control portion 43 turns around the lever shaft 31 in such a manner that the starting position and end position of its turn approach a handle grip b. Hence, the control portion 43 moves to follow the rider's fingers moving to control it, thereby improving the controllability of control lever 4.

The control lever 4 has at the boss 42 a retaining means 44 of a bore to retain a stop k of control wire W and a recess 46 supporting therein the click plate 45 a leaf spring engageable with the ball 34, and between the boss 42 and the control portion 43 a recess 47 incorporating therein a retaining mechanism 5 having a releasing means to be hereinafter described.

The retaining mechanism 5 retains the control lever 4 at a position corresponding to a desired speed change stage against a return spring at the derailleur. The retaining mechanism 5 shown in FIGS. 1 through 6, comprises a ball 51 and an engaging recess 37 engageable therewith. The ball 51 is held within a bore 48 provided at the boss 42 of control lever 4 in a relationship of being movable axially of the lever shaft 31, the engaging recess 37 being formed at the base 32. An arm 52 having a bore 52a for receiving therein the ball 51 is pivoted swingably to the control lever 4. The ball 51, as shown in FIG. 5, is inserted within the bore 48 and recess 37 so that the arm 52 retains the ball 51 in its position.

Figure 2:
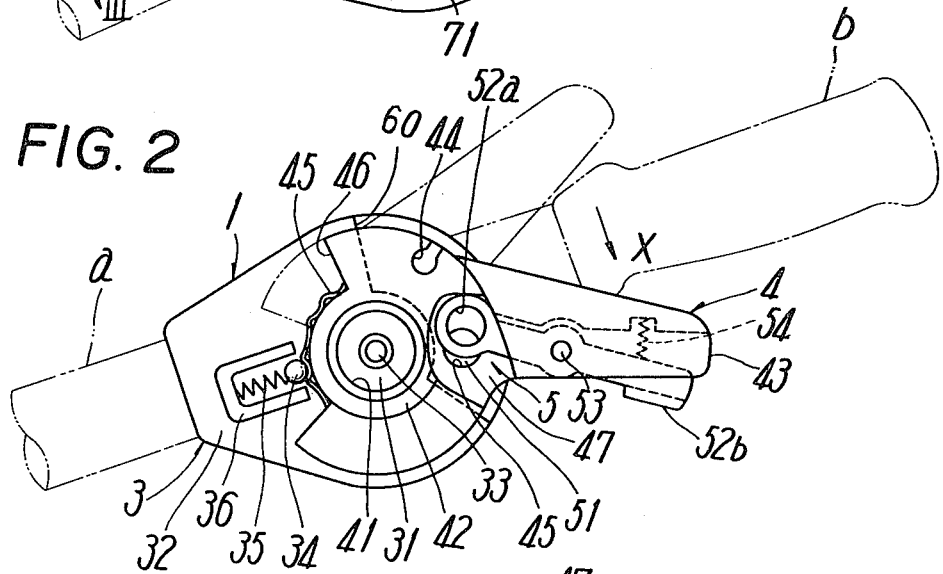
FIG. 2 is a plan view of the embodiment in FIG. 1, in which its cover is removed.
Figure 3:
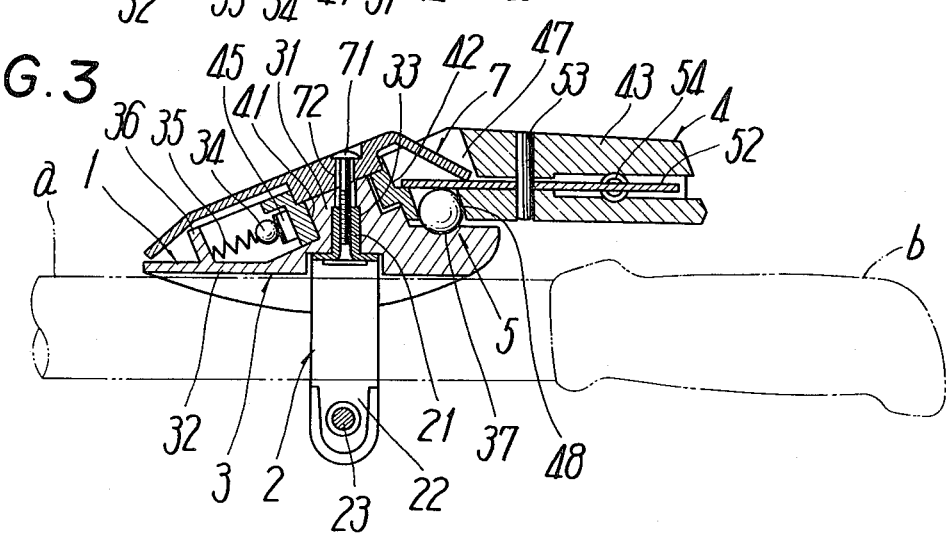
FIG. 3 is a sectional view taken on the line III—III in FIG. 1.
Figure 4:
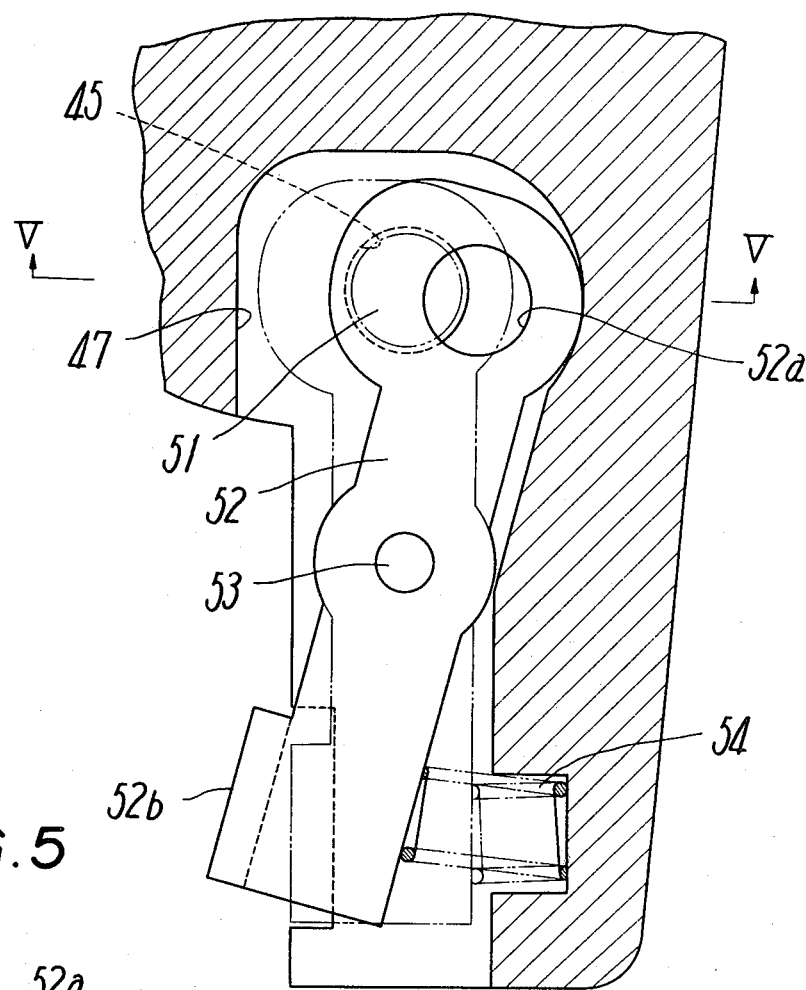
FIG. 4 is an enlarged sectional view of a principal portion of the speed changing device in FIG. 1.

The arm 52, which also functions as the releasing means, is made straight and disposed within the recess 47 as shown in FIGS. 2 through 4. The arm 52 is pivoted at its lengthwise intermediate portion to the control portion 43 of control lever 4 swingably in the same direction as the swinging direction of control lever 4, and is provided at one lengthwise end at the side of the lever shaft with the ball-receiving bore 52a and at the other end with a control 52b. A spring 54 retained at its one end to the control portion 43 biases the arm 52 to bring the control 52b out of the control portion 43 and to shift the receiving bore 52a from the bore 48 at the lever 4.

Figure 5:
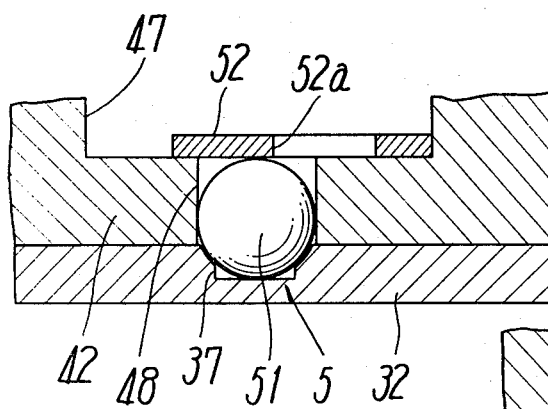
FIG. 5 is a sectional view taken on the line V—V in FIG. 4.

The arm 52, when positioned as shown by the solid line in FIG. 4, holds the ball 51 into the recess 37 so that the ball 51 retains the control lever 4 not to swing as shown in FIG. 5. On the other hand, the arm 52, when operated through the control 52b to be positioned as shown by the dot-and-dash line in FIG. 4, allows the receiving bore 52a to mate with the ball 51, whereby the ball 51 moves directly of the holding bore 48 to release the retained control lever 4.

Alternatively, the arm 52, as shown in FIG. 7, may be L-like shaped and pivoted at the bent corner to the control lever 4, and have at an end of the bent portion the ball-receiving bore 52a adapted so that the bore 52a may move in the direction (the direction Y in FIG. 7) of intersecting the swinging direction of control lever 4.

The ball 51, which is held in the bore 48 at the lever 4 in the aforesaid embodiment, alternatively, as shown in FIGS. 8 and 9, may be inserted into a blind bore 38 formed at the base 32 of supporting member 3 and be biased outwardly of the bore 38 by means of a spring 55, such as a coil spring or leaf spring.

In this instance, the arm 52 is supported to the control lever 4 at the base 32 side of supporting member 3 and has an engaging portion 52c engageable with the ball 51 moving outwardly of the bore 38.

The arm 52 shown in FIGS. 8 and 9, is L-like shaped as shown in FIG. 7, is pivoted at the bent corner to the lever 4, and has at an end of the bent portion the engaging portion 52c, the engaging portion 52c being formed in a bore and having a raised portion 52d at the rear side of the bore 52c in the direction (the direction Y in FIG. 7) of moving the bent portion of arm 52, thereby enabling the arm 52 to easily retain or release the control lever 4.

In this construction, the ball 51, as shown in FIG. 8, engages with the engaging portion 52c to retain the lever 4, which need not provide the holding bore 48 at the lever 4 as in the former embodiment. Furthermore, the control lever 4, once the ball 51 engages with the engaging portion 52c, is kept in a retained condition unless the arm 52 is operated, whereby it is possible to provide the raised portion 52d. As a result, the arm 52 is operated from the retained position as shown in FIG. 8 in the direction Y against the spring 54 to thereby readily bring the ball 51 out of the engaging portion 52c as shown in FIG. 9, thus releasing the arm 52 from the ball 51 rapidly and with a light touch.

Also, in this construction, the spring 55, which is provided within the bore 38 at the base 32, creates the clicking feel and generates noise. Hence, the click plate 45, ball 34, and holder 36, used in the former embodiment can be omitted.

Alternatively, the arm 52, as shown in another modified embodiment in FIG. 10, may be provided at one end with a hook 52e and at the other end with a control 52b and be pivoted to the lever 4, the base 32 of supporting member 3 having an engagement 39 of a ratchet tooth engageable with the hook 52e, so that the arm 52 may be retained without using the ball 51.

In addition, in the embodiments using the ball 51 and the embodiment having the hook 52e at the arm 52, one engaging recess 37, one holding blind bore 38, and one engagement 39, are provided, but they each may be two or more, and three or more for a three or more stage speed control device.

In case that the one engaging recess 37 and one holding blind bore 38 are provided at the two-stage speed control device, a stopper 60 is provided at the base 32 to restrict the lever 4 in its swinging range. In addition, the retaining mechanism 5 and releasing means, other than both using the single arm 52, may be separate from each other.

In addition, in the drawings, reference numeral 7 designates a cover which has a through bore 72 for a set screw 71 and a support 73 for an outer sheath O guiding the control wire W. The set screw 71 is screwed with an inner thread at the tubular shaft 21 at the supporting member 3 to thereby mount the cover 7 thereto. The cover 7, which press-contacts with the end face of tubular shaft 21, applies no rotational resistance to the lever 4.

Figure 6:
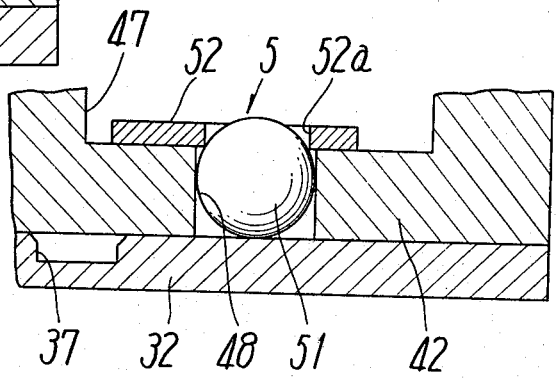
FIG. 6 is a sectional view corresponding to FIG. 5, in which a retaining mechanism is in a different working position.

Next, the speed changing device of the construction shown in FIGS. 1 through 6 will be described in terms of its function. The control lever 4 shown by the dot-and-dash line in FIG. 2 is positioned at the high speed stage, in which the lever 4 is pulled by the return spring at the derailleur and is stationary in contact with the stopper 60, whereby the ball 51 is kept in engagement with the receiving bore 52a as shown in FIG. 6.

When the lever 4 is operated in the direction of the arrow X in FIG. 2 and turned to the low speed position, the lever 4 is subjected to friction because the ball 51 insertably engages with the receiving bore 52a to release the retaining mechanism 5. Hence, only a small force against the return spring can operate the control lever 4. When the lever 4 reaches the end position of its rotation and the holding bore 48 mates with the engaging recess 37 at the base 32, the ball 51 insertably engages with the recess 37, at which time the spring 54 biases the arm 52 to swing as shown by the solid line in FIG. 4 to thereby retain the ball 51.

Hence, the lever 4 is retained against the tension of return spring applied to the control wire W, thereby being maintained at the low speed position as shown by the solid line in FIG. 2.

In a case that the control lever 4 is reoperated toward the high speed position, the control 52b is operated to swing the arm 52 in the same direction as the return direction of lever 4. When the arm 52 swings to mate the receiving bore 52a with the ball 51, the return spring acts to pull the control lever 4 so that the ball 51 comes out of the recess 37, thereby allowing the lever 4 to return to the high speed position as shown by the dot-and-dash line in FIG. 2.

As clearly understood from the above description, the speed control device of this invention can use its retaining mechanism to retain the control lever in its position corresponding to a desired speed change stage, whereby there is no need of applying to the control lever friction for overcoming the return spring at the derailleur, resulting in a control lever operable with a light touch.

Moreover, the control lever is operable in the direction of utilizing the tension of the return spring, that is, in the same direction of pulling the control wire, only by releasing the retaining mechanism, thereby improving the controllability and ensureing the retaining of control lever at the position corresponding to a desired speed change stage. As a result, even when the control wire along its way contacts with a foreign object to increase the tension of the wire, the control lever does not change its speed change position.

Furthermore, since the retaining mechanism incorporates the releasing means, the control lever, when turned to change speed, is released from its retained position through the releasing means, thereby operating the lever with a light touch.

Also, the releasing means incorporated in the retaining mechanism, is easy to operate, and the arm is pivoted to the lever so as to swing in the same direction as the control lever thereby enabling its successive operation and further simplifying the releasing operation.

As many apparently widely different embodiments of this invention may be made without departing from the spirit and scope thereof, it is to be understood that the invention is not limited to the specific embodiments thereof except as defined in the appended claims.

What is claimed is:

1. A speed control device for operating a control wire to actuate a derailleur comprising: a fixing member having a lever shaft and a control lever supported rotatably to said lever shaft and rotatable in predetermined directions to operate said control wire, said control lever having retaining means for retaining a terminal of said control wire, a retaining mechanism located between said control lever and fixing member which retains said lever at at least on speed control position, said retaining mechanism having a releasing means for releasing said lever from being retained, and having an arm supported to said control lever so as to be rotatable in the same directions as said lever, said arm being rotatable to release said lever from being retained.

2. A speed control device according to claim 1, wherein said retaining mechanism comprises one ball member and at least one engaging portion engageable therewith, said ball member being held by said control lever in a relationship of being movable in the same direction as said lever shaft, said engaging portion being provided at said fixing member, and said arm has a receiving portion receiving therein said ball member.

3. A speed control device according to claim 2, wherein said arm is formed straight and is pivoted at a lengthwise intermediate portion to said lever so that said receiving portion provided at said arm and receiving said ball member moves in the same direction as the rotating direction of said lever.

4. A speed control device according to claim 2, wherein said arm is L-like shaped and is pivoted at its bent portion to said lever, and said receiving portion provided at said arm and receiving said ball member is adapted to move in the direction which intersects the rotating direction of said lever.

5. A speed control device according to claim 1, wherein said retaining mechanism comprises; one ball member; one holding bore for holding said ball member; a spring biasing said ball member held within said holding bore, in the direction of projecting from said holding bore; said arm having an engaging portion engageable with said ball member projecting from said holding bore; said holding bore being provided at said fixing member, said arm being supported to said lever at a side thereof opposite to said fixing member.

6. A speed control device according to claim 5, wherein said arm is formed straight and pivoted at a lengthwise intermediate portion to said lever so that said receiving portion provided at said arm may move in the same direction as the rotating direction of said lever.

7. A speed control device according to claim 5, wherein said arm is L-like shaped and pivoted at its bent portion to said lever so that said receiving portion provided at said arm may move in a direction which intersects the rotating direction of said lever.

8. A speed control device according to claim 1, wherein said arm has a hook and said retaining mechanism comprises an engaging recess engageable with said hook, said arm being pivoted to said lever, said engaging recess being formed at said fixing member.

* * * * *